United States Patent [19]
Miller

[11] Patent Number: 6,100,518
[45] Date of Patent: Aug. 8, 2000

[54] METHOD AND APPARATUS FOR DISPENSING A LIQUID INTO A RECEPTACLE

[76] Inventor: Benjamin D. Miller, 1356 S. Sixth Ave., Des Plaines, Ill. 60018

[21] Appl. No.: 09/103,223

[22] Filed: Jun. 23, 1998

Related U.S. Application Data
[60] Provisional application No. 60/079,940, Mar. 30, 1998.
[51] Int. Cl.[7] .......................... G01V 8/20; G01S 17/481
[52] U.S. Cl. ............................ 250/222.1; 250/223 B; 141/1
[58] Field of Search ..................... 250/221, 222.1, 250/223 B; 73/293; 62/137; 137/391; 141/1, 2, 198, 351; 222/56

[56] References Cited

U.S. PATENT DOCUMENTS

| | | |
|---|---|---|
| 3,165,901 | 1/1965 | Weil et al. . |
| 3,217,509 | 11/1965 | Weil et al. . |
| 3,882,302 | 5/1975 | Deichmiller et al. . |
| 3,971,918 | 7/1976 | Saito . |
| 4,227,071 | 10/1980 | Tomyn . |
| 4,437,499 | 3/1984 | De Vale . |
| 4,440,200 | 4/1984 | De Vale . |
| 4,929,843 | 5/1990 | Chmielewski . |
| 5,040,196 | 8/1991 | Woodward . |
| 5,491,333 | 2/1996 | Skell et al. ........................... 141/95 |
| 5,534,690 | 7/1996 | Goldenberg et al. . |
| 5,550,369 | 8/1996 | Skell et al. . |
| 5,573,041 | 11/1996 | Skell et al. . |
| 5,744,793 | 4/1998 | Skell et al. ........................ 250/222.1 |

*Primary Examiner*—Stephone B. Allen
*Attorney, Agent, or Firm*—Wallenstein & Wagner, Ltd.

[57] ABSTRACT

The present invention relates to a method and apparatus for determining the size of an object. The method includes the steps of reflecting light from the object, measuring a plurality of adjacent light intensities reflected off an axis of the object, comparing adjacent light intensities, identifying a position where the light intensity markedly changes along the axis by a predetermined amount, and determining the size of the object from the identified position. The method is used to determine the amount of liquid necessary to fill a cup of the height determined. The apparatus for determining the size of an object includes means for reflecting light from the object, means for measuring a plurality of adjacent light intensities reflected off an axis of the object, means for comparing adjacent light intensities, means for identifying a position where the light intensity markedly changes along the axis by a predetermined amount, and means for determining the size of the object from the identified position.

31 Claims, 3 Drawing Sheets

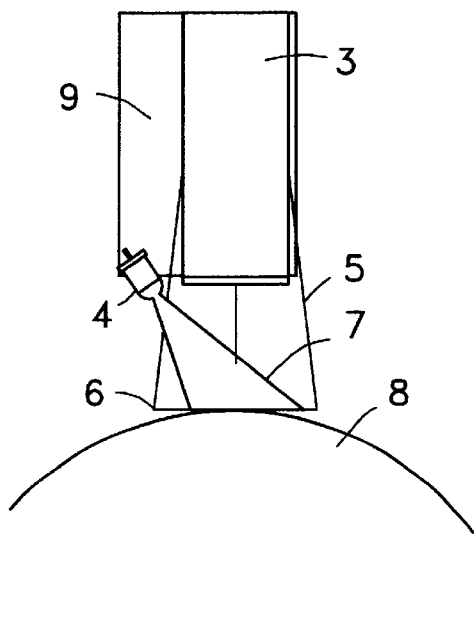
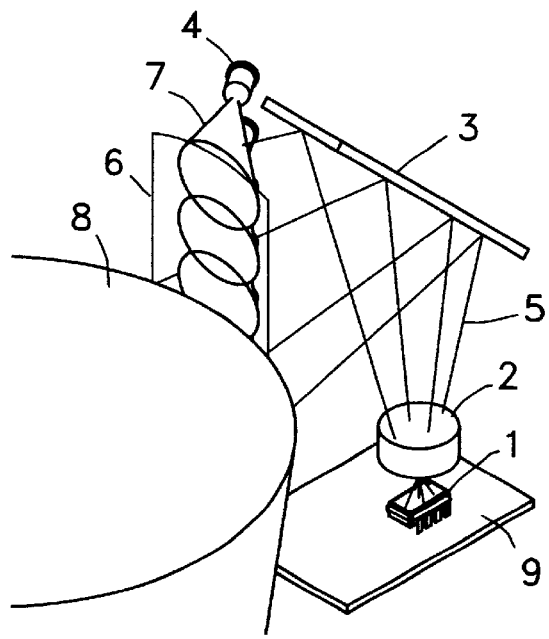
FIG. 1
FIG. 2
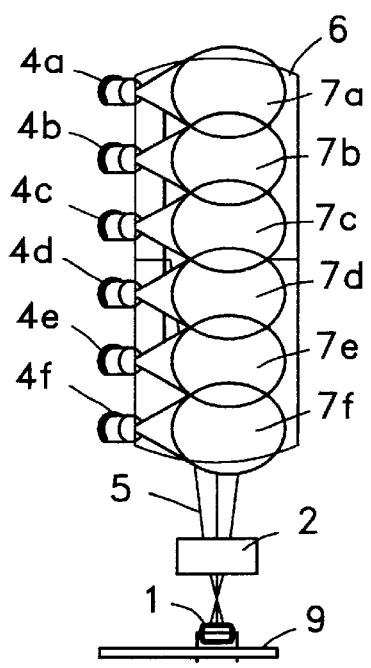
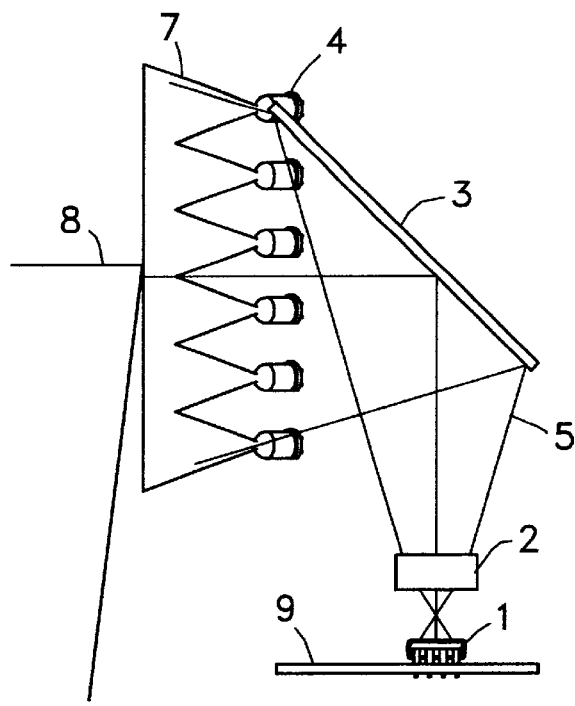
FIG. 3
FIG. 4

METHOD AND APPARATUS FOR DISPENSING A LIQUID INTO A RECEPTACLE

RELATED APPLICATIONS

This application claims the benefit of U.S. Provisional Patent Application Ser. No. 60/079,940, filed Mar. 30, 1998.

TECHNICAL FIELD

The present invention relates to a method and apparatus for determining the size of an object. More particularly, the present invention relates to a method of dispensing liquid into a receptacle based on the detected size of that receptacle.

BACKGROUND OF THE INVENTION

In the food service, convenience store, and restaurant industries, ice and beverages are often dispensed into cups by equipment such as beverage towers or combination ice and beverage dispensers. Dispensing is typically controlled manually by applying pressure against a lever with the cup. This tends to be slow when employees are pouring the drinks, as it requires the operator stay with the machine and monitor the filling. When used in self-serve applications, there is a significant amount of waste due to overfilling. Also, because the individual monitoring the filling/pouring is preoccupied, he/she cannot attend to other activities often necessary in the food service business.

Dispensing equipment is available having the ability to provide accurate portions of ice and beverage (U.S. Pat. No. 5,058,773 to Brill et al.; U.S. Pat. No. 4,921,149 to Miller et al.). Typically, however, the operator must press a button corresponding to the size of the cup being presented for filling. Although this speeds up employee service, errors are occasionally made by pressing the wrong button. In addition, this type of equipment has been found to be unacceptable for self-serve use, as the general public is unfamiliar with the proper button to press.

It is desirable for dispensing equipment to be able to recognize the size of the cup being presented and deliver the correct amount of product, e.g., soft drink, automatically. As far back as 30 years ago, manually operated switches were used on dispensers to select one of several portion sizes. (U.S. Pat. No. 3,211,338 to Weil et al.) More recent attempts have been made to use multiple photo-detectors for this purpose. (U.S. Pat. No. 4,437,499 to Devale; U.S. Pat. No. 4,440,200 to Devale et al.; U.S. Pat. No. 5,491,333 to Skelletal.) While the hardware has changed overtime, the new systems have no capability for sensing the more recent wider variety of cups. These prior systems also have several other disadvantages that will become apparent.

Cups in the beverage industry tend to be produced in a limited number of diameters in order to minimize the number of different lids required. Different liquid capacities in cups of the same diameter are accomplished by varying the cup's height. Typical methods of construction of cups include waxed paper with a rolled lip at the top, or one piece molded foam or plastic. Although a variety of colors and graphics may be present on the sides, the top lip is universally light colored, and most often white.

The number of different cups used in restaurants and convenience stores has been increasing, and it is not uncommon to have five or more different size cups in use at the same location. Existing devices are typically limited to sensing three different size cups, placing them into categories such as "small," "medium," and "large." This limitation is due to physical constraints on the size of the sensor(s), as well as the complexity of the electronics and the cost. In many applications, therefore, currently available devices are incapable of sensing all of the cups in use. Also, several cups exist having a shorter height but larger diameter, and actually hold more liquid than prior taller cups. As a result, the potential exists for existing devices to register these as smaller cups, and thus inadequately fill the cups.

The exact height and liquid volume of each category of cup size varies from one restaurant to another, as there are several dozen different sizes in use throughout the industry. It is therefore necessary to make adjustments to the dispenser to provide the correct amount of product based on the actual cups in use at a particular location. These adjustments need to be repeated if a different cup is introduced, when servicing or replacing one of the sensing devices, or if the equipment is relocated. This is of particular concern to equipment owned by major beverage companies or leasing companies wherein such equipment is routinely refurbished and moved from one location to another.

Existing devices identify the size of the cups using infra-red light along the side of the cup. This results in variability in signal strength due to colors and graphics. In fact, these devices can fail to sense very dark colored cups due to the absorption of the light beam by the cup.

Finally, some of the current devices are composed of several assemblies located remotely from each other within the equipment, and interconnected by a network of wiring. Such devices are typically installed in new products by the manufacturer and do not lend themselves readily to field retrofitting onto or into existing equipment.

SUMMARY OF THE INVENTION

According to a first aspect of the present invention, a device is provided capable of sensing and identifying a multitude of different height cups. The device senses the lip of a cup without regards to the color or graphics on the side of the cup. This device is self-contained and easily retrofitted onto existing dispensing equipment.

The present invention includes a cup sensor having one or more light sources illuminating a cup as the cup is moved into position for receiving product. A lens projects a reduced cup image onto a linear array of light sensitive elements. The elements are oriented along the vertical direction of the cup image. A mirror or prism bends the image 90 degrees, resulting in a more compact package capable of fitting behind the dispensing nozzle of a typical beverage valve.

A microprocessor and associated electronics selectively read the light level from each of the sensing elements. The top edge of the cup is characterized by an abrupt change in the light level, since no light is reflected from above the top of the cup, while the white lip reflects a considerable amount of light. The reflection from other areas of the cup varies based on color or graphics.

The microprocessor also controls operation of the light source, evaluates the received image, determines the size of the cup based on the information in memory, and transmits either a timed output signal to directly control a dispensing valve, or digital information communicated to a separate controller for further action. Additional visual or audible outputs can further provide feedback to the user if desired, for example to sound a tone when the cup has been successfully recognized.

The entire device is housed in a suitable enclosure supporting the various components. The housing has windows for the light rays to enter and exit, and protects the components from exposure to accidental spray and normal cleaning. The housing is also located vertically on the dispensing machine permitting the top edges of the desired range of cups to fall within the vision of the sensor.

Other features and advantages of the invention will be apparent from the following specification taken in conjunction with the following drawings.

BRIEF DESCRIPTION OF THE DRAWINGS

In order that the present invention may be more fully understood, it will now be described by way of example, with reference to the accompanying drawings in which:

FIG. 1 is a top plan view of the system showing the optical components and light rays, with a cup in position;

FIG. 2 is an isometric view of the system showing the optical components and light rays, with a cup in position;

FIG. 3 is a front elevation of the system showing the optical components and light rays, without a cup;

FIG. 4 is a side elevation of the system showing the optical components and light rays, with a cup in position;

DETAILED DESCRIPTION OF THE PREFERRED EMBODIMENT

Figure 5:
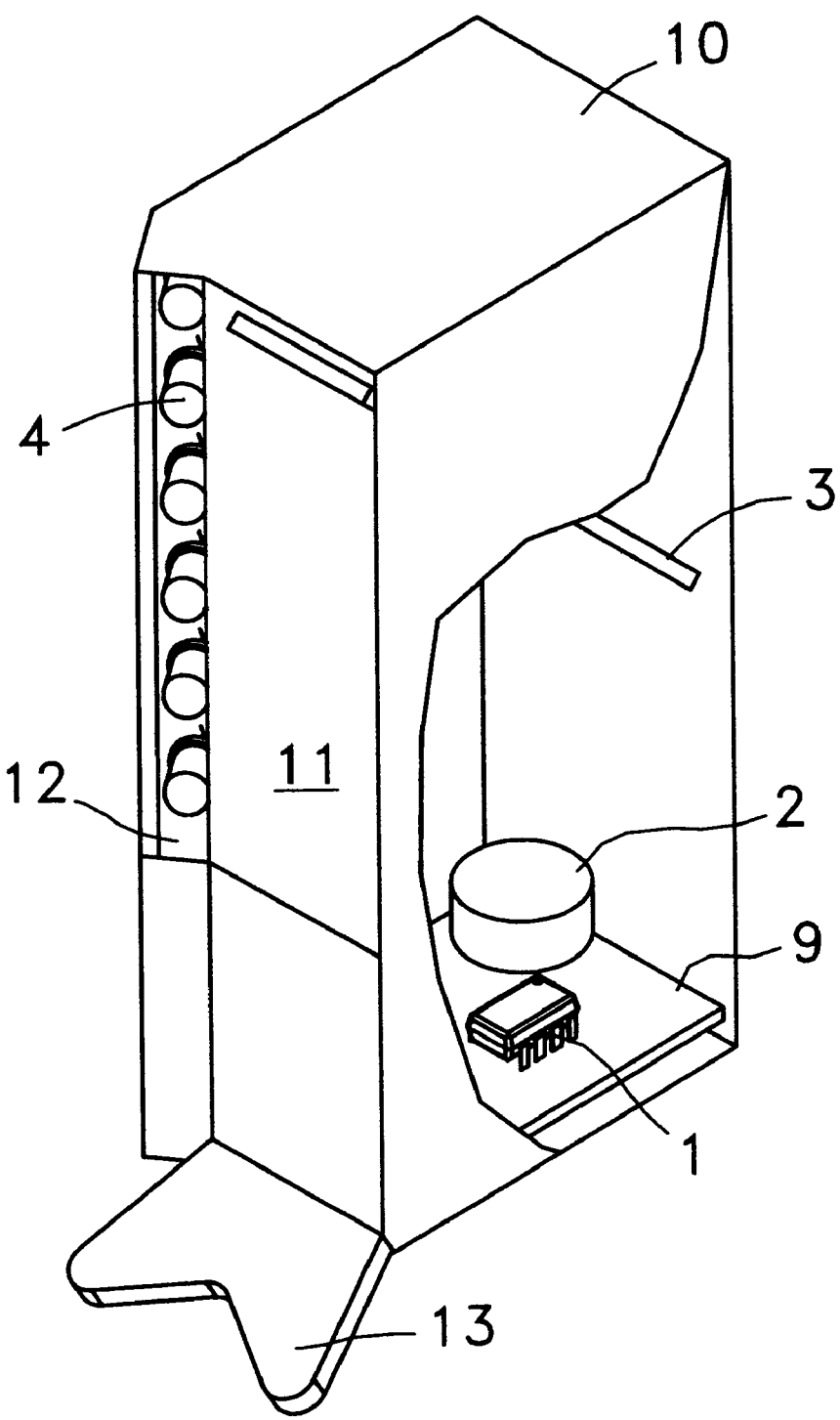
FIG. 5 is a perspective view of the housing exterior.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

With reference to FIGS. 1–4, a linear array of light sensitive elements 1 is mounted to a circuit board 9. This may be a series of individual sensing elements, but is preferably a commercial chip containing the sensing elements plus additional electronics. One such device is the Texas Instruments' TSL Series of Linear Optical Arrays, and particularly the TSL 1401, which contains 128 sensitive elements spanning a length of approximately 8 mm. Operation of this device is fully described in the manufacturers' data sheet.

A lens 2 is positioned above the elements 1 such that the lens 2 will focus an image from an object 8 located an appropriate distance in front of the lens 2 onto the sensor elements 1. For example, a magnification ratio of approximately 9.5:1 allows the 8 mm row of elements 1 to see a height range of approximately 76.2 mm (3"). Standard optical formulae are used to determine the necessary lens design. Such design may contain single or multiple optical elements depending on need. The lens 2 is advantageously supported on the circuit board 9 in order to maintain close relationship with the sensing elements 1. A threaded or telescoping tube may be employed to allow focusing adjustment.

A mirror 3 is positioned at a 45 degree angle (relative to the object 8 and the lens 2) so that the light rays 5 reflecting from the cup 8 make a 90 degree bend to the lens 2. The position of the mirror 3 is such that a vertical image is projected along the row or column of sensing elements 1. The mirror 3 is narrower from side to side than the view width of the lens 2, creating a viewing area 6 substantially taller than wider, but still considerably wider than the viewing field of the elements 1. This eliminates extraneous light otherwise introduced into the lens 2 from the sides, while still providing an adequate viewing area 6 to allow for tolerances in the components and their positions. Alternatively, a right-angle prism can be employed in place of the mirror 3.

An illumination source 4 is positioned to provide an area of illumination 7 within the viewing area 6 of the lens 2. This source 4 may be a single source, but is preferably multiple sources such as light emitting diodes (LED's) (shown by 4a–4f) positioned for the individual illumination areas 7a–7f to overlap and provide the total required area of illumination 7. The light source 4 may be white light or a narrow wavelength range to which the sensor elements 1 are most responsive. It has been found the device just described is most sensitive to red visible light (600–700 nm), having an illumination source consisting of red LED's.

The optical system as described is capable of determining the height of cups within a 76.2 mm (3") range, with a resolution of approximately 0.6 mm (0.023"). Obviously, the optical components and the number of sensing elements 1 can be varied to achieve other viewing ranges and resolutions.

With reference to FIG. 5, a housing 10 supports the components to maintain their correct relative positions. The housing 10 is generally opaque, preventing the entrance of stray light. It may be fabricated by several methods, for example by machining and subsequent bonding together of various materials, but it is preferably injection molded, containing a cover secured in such a way as to provide a substantially light, tight and water spray proof assembly. A transparent window 11 allows the light rays 5 to reach the mirror 3. This window 11 may be clear or a color that is only transparent to wavelengths near that of the source 4. Another window 12 allows the rays 5 from the source 4 to exit. This window 12 may be transparent, but some diffusion effect has been found advantageous in order to provide more even illumination from multiple sources. A protrusion 13 acts as a mechanical stop and controls the position of the cup 8. The point of contact with the cup 8 is well below the lip, maintaining sanitation, and is approximately in line with the force pushing the cup 8, resulting in little or no tipping tendency.

Figure 6:
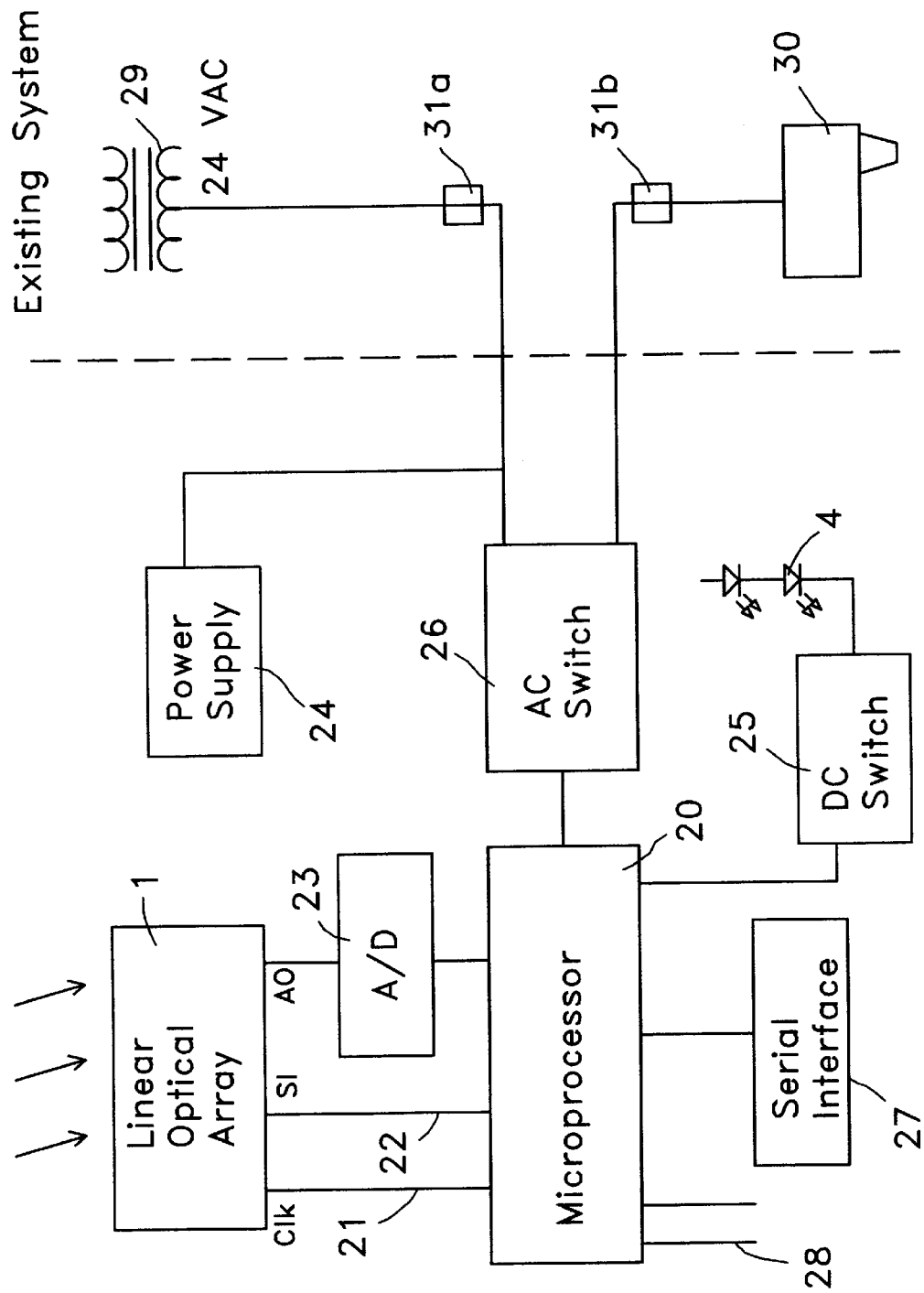
FIG. 6 is a block diagram of the control system.

FIG. 6 illustrates a block diagram of the control system. A power supply 24 receives AC voltage from either the existing beverage transformer 29 or an additional dedicated transformer, and provides the various voltages required by the circuitry.

The linear array 1 connects to a microprocessor 20 which provides the required clock 21 and initiate 22 signals. The analog output from the array is converted to digital values by an A/D converter 23. Although shown separately, the A/D converter is preferably an integral part of the microprocessor.

A DC switch 25 controls operation of the light source 4 in response to signals from the microprocessor 20. This switch may be any of a number of devices, such as a bipolar or field effect transistor.

A serial interface 27 allows for external communication, for example in automated ice dispensing equipment where the dispenser operation is under control of a master processor, or with a diagnostic or programming device. This communication may advantageously be on a bus such that multiple devices can use the same wires.

For stand-alone operation, an AC switch 26 controls operation of a beverage valve 30 in response to the microprocessor 20. This switch may be a mechanical relay or a solid state device, such as a triac.

Additional microprocessor connections 28 may operate audible or visual signal devices.

As can be seen in FIG. 6, connections can be easily made to the existing electrical system by inserting the control system into the existing valve connector 31a and 31b, a standard connector used industry-wide.

The method associated with controlling the present invention includes reading the light levels of all of the elements 1 with the light source 4 de-energized to obtain the background levels; reading the light levels of all of the elements 1 with the light source 4 energized to obtain the cup (if present) plus background levels; and, subtracting the former from the latter values to effectively cancel background lighting effects. In addition, the rate at which readings are taken may be varied to adjust the sensitivity of the sensor elements 1 to ensure the analog levels are within the range of the A/D converter. These steps may be repeated periodically until an object 8 enters the viewing area 6 of the sensor.

The present invention can reject light patterns known to not represent a cup 8 (for example, an object 8 coming down from above rather than up from below). Also, the present invention allows for the determination of the height of the cup 8 based on the point along the sensing element array where light level changes abruptly at the top edge of the cup 8. Specifically, the present invention measures a plurality of light intensities reflected along the vertical axis, and compares adjacent light intensity measurements. The position where the light intensity decreases in an upward direction by a predetermined amount identifies the point at which light level changes abruptly at the top edge of the cup 8. The cup 8 can be identified by reference to lookup data based on the measured height. In the case where the sensor is part of a master control system, the present invention may be used to communicate by the appropriate protocol to the master controller for further action. In the case where the sensor operates in a stand-alone mode, the present invention may be used to energize the beverage valve for a pre-determined time based on the known cup size. Additional signals, either audible or visual, may be included for various purposes such as to provide feedback to the users or for diagnostic functions.

While the specific embodiments have been illustrated and described, numerous modifications come to mind without significantly departing from the spirit of the invention and the scope of protection is only limited by the scope of the accompanying claims.

I claim:

1. A method for determining the size of an object, comprising the steps of:
   reflecting light from the object;
   measuring a plurality of adjacent light intensities reflected off an axis of the object;
   comparing adjacent light intensities;
   identifying a position where the light intensity markedly changes along the axis by a predetermined amount; and,
   determining the size of the object from the identified position.

2. The method of claim 1 wherein the light is reflected using an illumination source.

3. The method of claim 2 wherein the illumination source further includes a plurality of light emitting diodes.

4. The method of claim 1 wherein the light intensities are measured using a plurality of light sensitive elements.

5. The method of claim 4 further comprising the step of focusing the light intensities onto the plurality of light sensitive elements.

6. The method of claim 5 wherein the light intensities are focused using a lens.

7. The method of claim 1 further comprising the step of bending the reflected light before measuring the light intensities.

8. The method of claim 7 wherein the reflected light is bent using a mirror or a prism.

9. The method of claim 1 wherein a microprocessor compares the light intensities, identifies the position, and determines the size of the object.

10. The method of claim 1 further comprising the step of alerting a user after the size of the object is determined.

11. The method of claim 1 wherein the size being determined is the height, the axis is a vertical axis, and the position being identified is where the light intensity decreases in an upward direction.

12. A method of dispensing liquid into a cup using the method of claim 11, further comprising the step of determining from the identified position the amount of liquid necessary to fill the cup.

13. A method of dispensing liquid into a receptacle, comprising the steps of:
   reflecting light from the receptacle;
   measuring a plurality of light intensities reflected from an axis of the receptacle;
   comparing light intensities;
   identifying a position where the light intensity changes by a predetermined amount; and,
   determining from the identified position the amount of liquid necessary to fill the receptacle.

14. The method of claim 13 further comprising the step of dispensing the amount of liquid determined.

15. The method of claim 13 wherein the light is reflected using an illumination source.

16. The method of claim 15 wherein the illumination source comprises a plurality of light emitting diodes.

17. The method of claim 13 wherein the light intensities are measured using a plurality of light sensitive elements.

18. The method of claim 17 further comprising the step of focusing the light intensities onto the plurality of light sensitive elements.

19. The method of claim 13 further comprising the step of bending the reflected light before measuring the light intensities.

20. The method of claim 19 wherein the reflected light is bent either using a mirror or a prism.

21. The method of claim 13 wherein a microprocessor compares the light intensities, identifies the position, and determines the amount of liquid necessary to fill the receptacle.

22. The method of claim 13 wherein the axis is a vertical axis and the position being identified is where the light intensity decreases in an upward direction.

23. An apparatus for determining the size of an object, comprising:
   reflecting means for reflecting light from the object;
   measuring means for measuring a plurality of adjacent light intensities reflected off an axis of the object;
   comparing means for comparing adjacent light intensities;
   identifying means for identifying a position where the light intensity markedly changes along the axis by a predetermined amount; and,
   determining means for determining the size of the object from the identified position.

24. The apparatus of claim 23 wherein:

said reflecting means includes an illumination source;

said measuring means includes a plurality of light sensitive elements; and, said determining means includes a microprocessor.

25. The apparatus of claim 24 wherein the illumination source comprises a plurality of light emitting diodes.

26. The apparatus of claim 24 further including focusing means for focusing the light intensities onto the plurality of light sensitive elements.

27. The apparatus of claim 23 further including bending means for bending the reflected light.

28. The apparatus of claim 27 wherein the bending means includes either a mirror or a prism.

29. The apparatus of claim 23 wherein the object is a receptacle and the apparatus further including a second determining means for determining from the identified position the amount of liquid necessary to fill the receptacle.

30. The apparatus of claim 29 further including dispensing means for dispensing the amount of liquid determined.

31. The apparatus of claim 23 further including a housing to support the reflecting means and the comparing means.

* * * * *